OSCILLATORY ENERGY GENERATING APPARATUS

Filed Dec. 1, 1967 2 Sheets-Sheet 1

INVENTOR.
HAL C. METTLER
BY
Christie, Parker & Hale
ATTORNEYS

OSCILLATORY ENERGY GENERATING APPARATUS

INVENTOR.
HAL C. METTLER
BY
Christie, Parker & Hale
ATTORNEYS

United States Patent Office 3,524,082
Patented Aug. 11, 1970

3,524,082

OSCILLATORY ENERGY GENERATING APPARATUS

Hal C. Mettler, 680 Westbridge Place, Pasadena, Calif. 91105

Filed Dec. 1, 1967, Ser. No. 687,325
Int. Cl. H01v 7/00
U.S. Cl. 310—8.1 8 Claims

ABSTRACT OF THE DISCLOSURE

An ultrasonic cleaner having a piezoelectric crystal attached to a metallic tank for generating mechanical vibratory energy in the tank. An electrical circuit having a transistor and transformer in combination with the crystal generates the electrical signals for energizing the crystal.

BACKGROUND OF THE INVENTION

This invention relates to oscillatory circuits. A preferred embodiment of the invention relates to mechanical vibratory energy generating apparatus and, more particularly, to vibratory energy generating apparatus employing piezoelectric crystals.

Apparatus for generating mechanical vibratory energy, which employs piezoelectric crystals, is well known. Prior art apparatus generally employs an electrical circuit for energizing the crystal which is quite complex and normally employs a large number of components which results in a costly apparatus. Also, most prior art circuits employ vacuum tubes for energizing the crystal because of the high voltage requirements for energizing the crystal.

SUMMARY OF THE INVENTION

Briefly an embodiment of the invention is in a circuit for generating oscillatory power signals. An oscillatory circuit is provided which includes a switching circuit having at least input and output circuits and a control for controlling the flow of current through the input and output circuits and a coupling means for coupling signals from the input/output circuit to the control electrode for maintaining oscillation thereof. A load circuit is coupled in series with the control electrode and the coupling means. The load circuit has an impedance which dissipates the major portion of the oscillatory power produced in the entire circuit.

In a preferred embodiment the switching circuit is a transistor which is biased into a saturated conductive condition when the base to emitter circuit is forward biased and wherein the crystal has a resonant frequency sufficiently high that the transistor is maintained in a saturated conductive condition because of minority carrier storage in the base circuit for a substantial portion of a half cycle when its base emitter electrode circuit is reverse biased because of signals applied thereto.

Also in a very important and preferred embodiment, the load circuit includes a piezoelectric crystal which has a metallic coating on one side thereof for mechanically and electrically coupling the crystal to an ultrasonic cleaning tank. Another side of the crystal has at least two separate metallic contacts thereon across which the crystal is energized.

A very important feature of the invention is that the load is taken in series with the control electrode of the switch. Also, of equal importance, is the fact that the major portion of the oscillatory power produced or dissipated by the entire circuit is in series with the control electrode of the switching circuit. Thus, in the embodiment where the switch is a transistor, the load current is fed through the base of the transistor. The importance of this fact cannot be overemphasized. One very important fact is that the right amount of drive power is always furnished to the control electrode of the switch at the right time. Another highly important fact is that it causes extremely rapid switching of the transistor switch (in the embodiment employing the transistor switch) and as a result the transistor switches from saturation to nonconduction in a minute amount of time. The importance of this rapid switching is that, since the heat generated in the transistor occurs mainly during switching, reducing the switching time results in lower heat or power dissipation in the transistor. The switching time is so rapid that the short switching time alone is novel for power oscillator circuits.

A number of unusual results arise with such a circuit employing a transistor switch. For example, with 60 watts of power delivered to the load circuit, only 3 watts of power was found to be dissipated by the transistor switch. Further evidence of the unusually low power dissipation is given by a comparison made with a prior art circuit. Using the same transistor, load, and thermal environment as in the circuit of the present invention, but operating the transistor switch in a conventional Class C biased circuit arrangement (base electrode is negative biased), it was found that with 45 watts of power drawn by the total circuit the transistor itself operated at about 140° to 150° Fahrenheit on a medium heat sink. In contrast, however, the same transistor embodied in the circuit of the present invention, with 80 watts of power drawn by the total circuit, operated at a substantially lower temperature of 105–110° Fahrenheit. This evidences the marked reduction in power dissipation in the transistor itself when operated in accordance with the present invention.

Further unusual characteristics of a circuit employing a transistor and embodying the present invention is that it has been found by tests that a power transistor would not normally work efficiently above about 500 kilocycles. However, it has been found by tests that power transistors used in a circuit embodying the present invention will work highly efficiently at over 2 megacycles. The reason for this unusual operation is that the drive for the transistor causes it to switch on and off very rapidly. Also, tests have been conducted at very high frequencies in the order of 2 megacycles on an embodiment of the present invention employing a transistor and a piezoelectric crystal in an ultrasonic nebulizer. The tests were conducted using meters to measure ultrasonic power delivered by the crystal and total line power delivered to the circuit. During these tests it was found that as much as 50% of the line power was converted to ultrasonic power at the crystal. This is unusually high efficiency at the high frequencies of operation involved.

Additional tests have revealed that the circuit employing the transistor and piezoelectric crystal and embodying the present invention provides very strong and stable oscillations at line voltages from 4 volts to 130 volts A.C. and even higher. The maximum voltage is limited by the maximum voltage the transistor is capable of withstanding. Further, an ultrasonic cleaner employing such a circuit and operating at 60 kilocycles per second was operated and the collector voltage was modulated from direct current up to 3 kilocycles. It was found that the efficiency of the cleaner operation was unaffected. It has also been found that the circuit will produce exceptionally good power signals across the crystal of 1 to 2 volts up to 2,000 volts.

A reason for the stable operation described above is that there is a self-compensating base drive current from the load circuit. The base current increases and decreases with the load current, whereas in prior art circuits it is not possible to have this direct feedback to the base.

Another important feature is that in the embodiment employing a transistor the collector of the transistor is maintained in saturation or cutoff over substantially all of the operating cycle, whereas this is normally not possible in prior art circuits without many additional components in the collector circuits.

Additionally, by using a sufficiently high frequency of oscillation it is possible to cause minority carrier storage in the base circuit of the transistor as the transistor is driven into cutoff, causing the transistor to remain in a conductive and saturated condition, even after the transistor is cut off. This results in a further decrease in the power dissipation in the transistor. Additionally, utilizing the minority carrier storage in the base circuit, it has been found that the circuit will operate with the transistor in saturation, approximately 50% to 90% of the oscillatory cycle. This is in sharp contrast to prior art oscillators employing transistors which operate in Class C operation where the transistor is in saturation only about 20% to 40% of the oscillatory cycle. As a result, the power dissipation in the transistor is lowered considerably as compared with prior art circuits. This is a very important feature but not an essential feature of the present invention.

Another feature is that there is a minimum amount of distortion in the crystal load circuit as a result of decoupling, caused by a leakage inductance of the transformer when the switch is switched into a non-conductive condition. Prior art circuits require additional circuitry in the collector circuit to provide this function.

Another important feature of the invention employing a piezoelectric crystal is that the circuit allows the crystal to drive the circuit at its natural resonant frequency providing the maximum energy transfer to the load which is connected to the crystal.

One prior art circuit is the conventional Hartley oscillator employing a transistor switch. An example of this oscillator is shown in the book entitled "Transistor Circuit Engineering" by Shea published by John Wiley & Sons, Inc. in 1957, at page 232. However, this circuit is quite different from the present invention in that the load is not taken in series with the base of the transistor. Additionally, a piezoelectric crystal is not employed in the base circuit of the transistor in the Hartley oscillator for providing power.

These and other advantages of the present invention can be more fully understood with reference to the following description of the drawings.

DESCRIPTION OF THE PREFERRED EMBODIMENT

Figure 1:
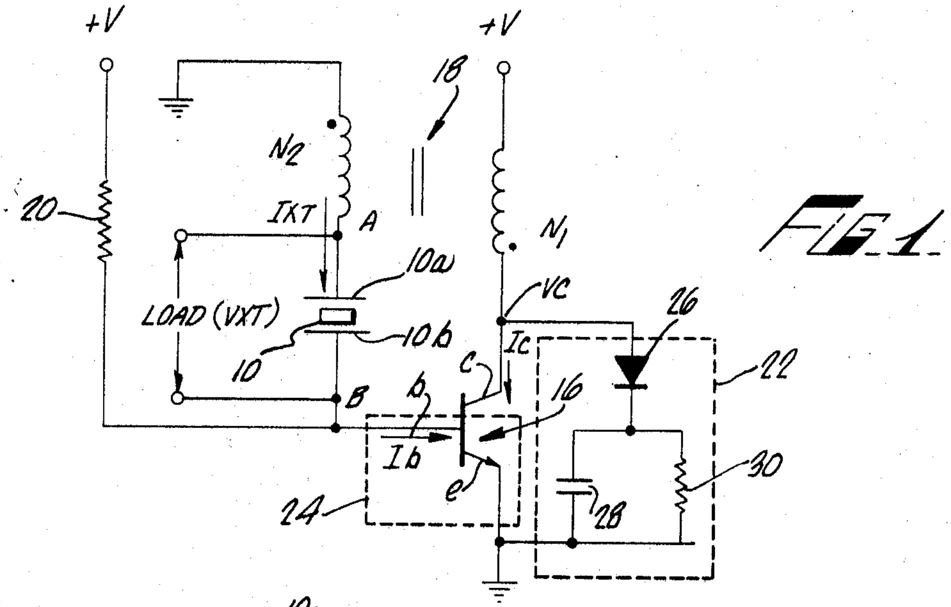
FIG. 1 is a schematic diagram of a vibratory energy generating apparatus and embodying the present invention.
Figure 3:
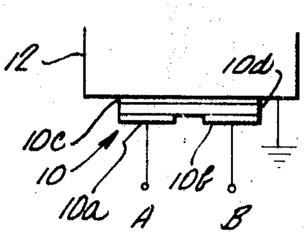
FIG. 3 is a sketch illustrating the way in which the crystal of FIGS. 1 and 2 is connected to a tank in an ultrasonic cleaning unit and embodying the present invention.

Refer now to the ultrasonic vibratory energy generating apparatus shown in FIG. 1. The apparatus of FIG. 1 contains a piezoelectric crystal assembly 10. As indicated in FIG. 3, the crystal assembly is connected to the bottom of an ultrasonic cleaning tank 12. The tank 12 is a metallic tank and the crystal 10 is joined to the bottom of the tank by means of glue or epoxy or other well known means.

Figure 2:
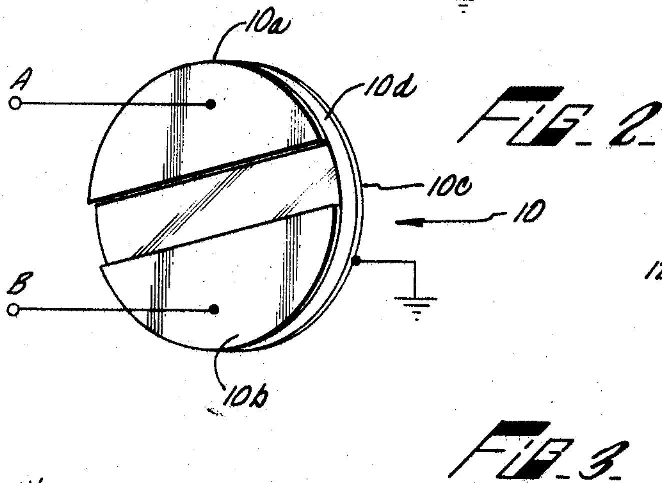
FIG. 2 shows a pictorial view of the crystal assembly the crystal used in the circuit of FIG. 1 and embodying the present invention.

FIG. 2 shows a pictorial view of the crystal assembly 10. The crystal includes the actual piezoelectric crystal **10*d* and metallic contacts 10*a*, 10*b* and 10*c***. Metallic contact

**10*c* is the one which is connected to the tank 12 in FIG. 3. It is important to note that the contact 10*c* is affixed to the tank 12 so that it is electrically, as well as mechanically, connected. The contacts 10*a* and 10*b* arrangement are quite important and should be noted. As indicated, the contacts 10*a* and 10*b* are not joined together but are seperated. Thus at FIG. 2, the crystal 10*b* can be seen in between the contacts 10*a* and 10*b*. This structure is quite different to prior art crystals which generally have a single contact on each side of the crystal. To be explained in more detail, the metallic tank 12 and the contact 10*c* are connected to ground, whereas an alternating current energizing signal is applied in between the separate metallic contacts 10*a* and 10*b***.

Returning to FIG. 1, the contacts **10*a* and 10*b*** are connected to terminals A and B. The terminal B is connected to the base *b* of a NPN transistor 16. The contact **10*a* of the crystal is connected via the terminal A to one end of the secondary winding N2 of a transformer 18. The other end of the secondary winding N2 is connected to ground (0 volt potential). Thus, it will be seen that the secondary winding N2 as well as the crystal 10 are connected in series with the base electrode of the transducer 16.**

The emitter electrode of the transistor 16 is connected to ground and the collector electrode is connected in series with the secondary winding N1 of the transformer 18 to a source of direct current potential +V. A biasing resistor 20 is connected between the source of potential +V and the junction between the crystal 10 and the base electrode of the transistor 16. A low impedance circuit 24 is indicated by dashed lines between the base electrode of the transistor 16 and the emitter electrode. The low impedance is required between the contact **10*b* of the crystal 10 and ground over substantially all of the oscillatory cycle of the circuit. The transistor 16 has a low impedance between the base and emitter electrodes when it is biased into a saturated conductive condition. Therefore, it exhibits a low impedance over one half of the cycle. If the transistor 16** has a low voltage reverse bias breakdown of about 5 to 10 volts, between emitter and the base electrodes, then it will provide a low impedance circuit during reverse bias as well as forward bias. If this is the case, then the transistor itself provides the low impedance circuit between the base and emitter electrode over substantially the entire oscillatory cycle and no additional component is needed.

However, should the transistor 16 have a high voltage breakdown, substantially in excess of 5 to 10 volts in the reverse direction between the emitter and base electrodes, then an additional component is required. In a preferred embodiment of the invention the additional component is a low impedance diode 24' having its cathode and anode electrodes connected between the base and emitter electrodes, respectively, of the transistor 16. The diode is shown by way of example in FIG. 4.

Dots are used to indicate the polarity of the primary and secondary windings of the transformer 18.

A protection circuit 22 is provided to prevent damage to the transistor 16 from any inductive spikes provided by the primary of the transformer 18. The protection circuit 22 is not essential to the present invention and is provided only when required for safety purposes. The circuit 22 includes a diode 26 having its anode electrode connected to the collector of the transistor 16. The cathode electrode of the diode 26 is connected to a junction between one side of a capacitor 28 and a resistor 30. The other end of the capacitor and resistor are joined together and are connected to ground.

Consider now the operation of the mechanical vibratory energy generating apparatus of FIG. 1. Reference should be made in the following discussion to the wave forms shown in the sketch of FIG. 5. The current and voltage wave forms are nonlinear because of the circuit characteristics. Initially, the resistor 20 biases the transistor 16 into a conductive condition. This causes a current labelled $I_c$ to start flowing down from the +V source of potential through the primary winding N1 through the collector to emitter electrodes of the transistor 16 to ground. As the current $I_c$ starts increasing through the primary winding N1, this current is reflected into the secondary winding N2. The polarity of the windings N1 and N2 are such that current $I_{xt}$ is forced to flow through the crystal 10 in the direction indicated by the arrow. As the current through the crystal 10 increases, the current through the base of the transistor 16 also increases causing current through the collector-emitter circuit to increase further.

Figure 5:
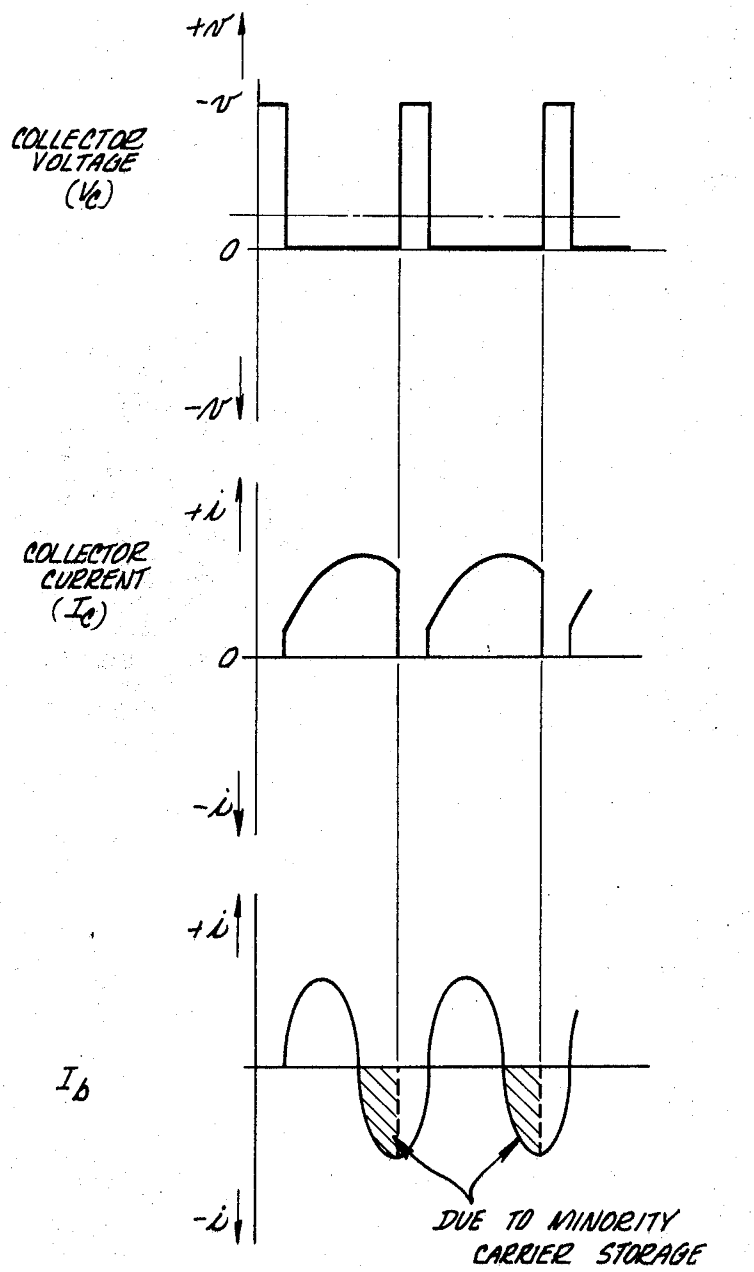
FIG. 5 is a sketch illustrating the wave forms at the indicated points in the circuit of FIG. 1.

Consider the normal operation after the circuit operation has stabilized. The characteristics of the current through the collector to emitter circuit of the transistor is controlled to a large extent by the inductance of the primary winding N1. Also, the parameters of the crystal 10 and the secondary winding N2 are such that they form a tuned circuit and cause oscillation. Thus, as indicated in FIG. 5, the signal in the circuit formed by the secondary winding N2, the crystal 10, and the base to emitter circuit of the transistor is oscillatory and has a generally sinusoidal wave form. In contrast, the collector current of the transistor encounters a sharp increase in current from zero to some initial value, then goes through a period of gradually increasing current followed by a period of gradually decreasing current. The collector current then drops sharply back to zero and remains at zero for a short period of time. This occurs for each cycle of the base current. The controlling action of the inductance in the primary winding N1 determines the gradually changing current signal in the collector circuit of the transistor. In an embodiment of the invention the rise and fall times for the current is in the order of 0.3 of a microsecond whereas the total cycle time is in the order of 16 microseconds. Therefore, the rise and fall times are negligible compared with the total cycle time, and dissipation in the transistor is minimized.

The coupling through the transformer 18 is quite loose and thereby allows the oscillatory signals to take place in the circuit including the secondary winding N2, the crystal, and the base to emitter circuit of the transistor. With this arrangement, the signals coupled from the primary winding to the secondary winding serve to provide the required energy to maintain the above-mentioned circuit in oscillation.

Several important points should be noted quite carefully. First, the frequency of oscillation is determined by the crystal 10. The crystal 10 oscillates at its natural resonant frequency. Also, not essential to the present invention but an important feature of one embodiment of the present invention is that the frequency of oscillation of the crystal 10 is sufficiently high as compared with the characteristics of the transistor that when the base current is driven from a positive to a negative value, the transistor 16 continues in a conductive condition between collector and emitter through a substantial portion of the negative cycle. The reason for this operation is that minority carriers are built up in the base circuit of the transistor 16 when the current flows in a positive direction. Therefore, when the current goes to a negative value, it takes an appreciable amount of time for the minority carriers to be swept out of the base of the transistor 16. While this occurs, the transistor 16 is maintained in a saturated conductive condition. The time during which the minority carriers are effective is indicated by the shaded area under the wave form *Ib* in FIG. 5.

Thus, referring to FIG. 5, it will be noted that the collector voltage on the transistor 16 is maintained at approximately 0 volts and that the transistor is maintained in a saturated condition long past the point where the base voltage *Ib* goes to a negative value. When the minority carriers are swept out of the base of the transistor 16 (indicated by dashed line), the base current rapidly goes to zero and the transistor is switched into a non-conductive condition.

For the example where the reverse breakdown voltage of the transistor itself is sufficiently low to allow negative current flow through the base to emitter circuit during the entire negative current cycle, the current wave form for the base current *Ib* is indicated in FIG. 5 by the solid line. Where the low impedance is provided by another component such as a diode connected across the base to emitter circuit then the base current *Ib* would go to zero after the minority carriers are dissipated as indicated by the dashed line in FIG. 5. After the base current goes to zero as indicated by the dashed line the negative current is carried by the additional component.

This operation is quite important as it permits the transistor to remain in a saturated condition over much more of the operating cycle than the transistor is held in a non-conductive condition. As a result, the power loss in the transistor is substantially reduced. Typical Class C oscillators have a ratio of saturated condition to total cycle time of around 20% to 40%. With reference to FIG. 5, it will be seen that the ratio of saturation time to total cycle time is about 80%. In an actual embodiment of the invention it has been found that this ratio is preferably between 50% to 90% of all the cycle.

It is important that at all times the impedance between the base and the emitter electrodes of the transistor 16 be sufficienly low to insure a high Q in the crystal circuit. Also when the low impedance circuit 24 is actually part of the transistor 16 then it is important that the transistor 16 have a low potential reverse breakdown voltage.

Figure 4:
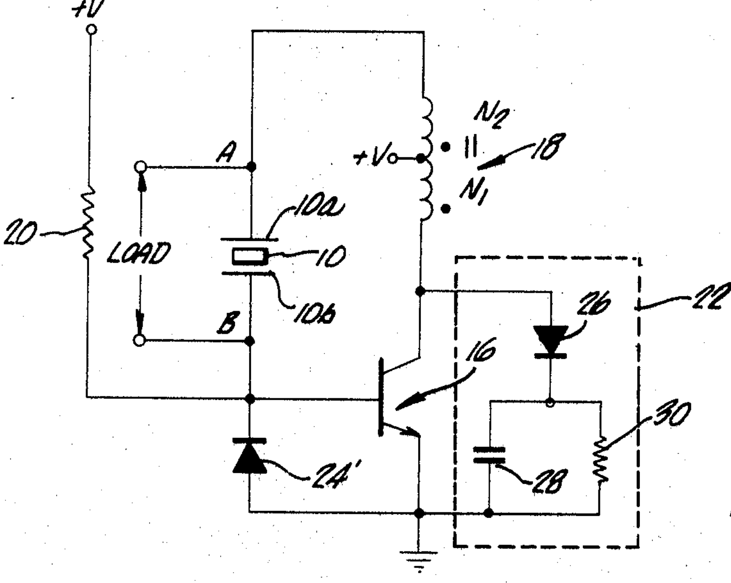
FIG. 4 is an alternate circuit for the mechanical vibratory energy generating apparatus and embodying the present invention.

FIG. 4 shows an alternate circuit arrangement which embodies the present invention. In contrast to FIG. 1, FIG. 4 shows a diode 24' with its cathode electrode connected to the base electrode and its anode electrode connected to ground. In FIG. 4 the diode 24' is used as the low impedance circuit during the negative excursion of current through the crystal 10.

Also, rather than connecting the secondary winding N2 to ground, it is connected to the +V source of voltage. Since the same components are utilized in FIG. 4 for the rest of the components as in FIG. 1, identical reference numbers are used.

The present invention also has applications other than for ultrasonic energy generating apparatus. For example, the crystal load could be replaced with a load circuit including the parallel combination of a capacitor and a resistor, or including other circuit elements provided the characteristics thereof are such that a tuned circuit is formed in conjunction with the windings of the transformer. Such a circuit would still have such important features as a properly biased transistor, the right amount of drive being provided to the transistor at all times, and the circuit being virtually insensitive to the load taken in series with the base of the transistor.

The preferred embodiment however is with a piezoelectric crystal, as shown, as it has the additional important characteristic that the frequency of the vibratory energy is determined automatically by the crystal.

The subject invention has been described with reference to certain preferred embodiments; it will be understood by those skilled in the art to which this invention pertains that the scope and spirit of the appended claims should not necessarily be limited to the embodiments described, as certain typical replacements and refinements have been mentioned hereinbefore.

Although a preferred embodiment of the present invention employs a piezoelectric crystal in the ultrasonic cleaner, it should be understood that one could employ a magnetostrictive element in place thereof within the scope of the appended claims with appropriate rearrangement of the elements. Other loads might be devised for the circuit within the scope of the appended claims, although the most preferred embodiment and the one that produces the most unusual characteristics is a piezoelectric crystal.

I claim:

1. A circuit for generating oscillatory power signals the combination comprising, a transistor having emitter, base and collector electrodes, the emitter electrode being connected to a reference potential, a transformer having a primary winding coupled in series with the collector electrode of the transistor and a secondary winding coupled in series with the base electrode and a load impedance coupled in series with the base electrode and secondary winding, said load impedance circuit having an impedance which dissipates the major portion of the oscillatory power produced in the entire circuit, coupling between the transformer windings providing a positive feedback to the secondary winding causing the circuit to be maintained in an oscillatory condition.

2. In a circuit as defined in claim 1 comprising a circuit between the base and the emitter and collector electrode circuit thereof exhibiting a low impedance path therebetween over substantially all of an oscillatory cycle thereby causing power to be applied across said load impedance over substantially the entire oscillating cycle.

3. A circuit as defined in cliam 2 wherein said transistor is biased into a saturated conductive condition when the base to emitter circuit is forward biased and wherein the frequency of oscillation is sufficiently high that said transistor is maintained in a saturated conductive condition because of minority carrier storage for a substantial portion of a half cycle when its emitter electrode circuit is reverse biased because of signals applied thereto, thereby minimizing the power loss across said transistor.

4. A circuit for delivering mechanical vibratory power the combination comprising a transistor having emitter, base and collector electrodes, a transformer having a primary winding serially coupled between the collector electrode and a source of power and having a secondary winding with one end coupled to the emitter electrode, a piezoelectric crystal element coupled between the other end of the secondary winding and said base electrode, said crystal being coupled to structure and delivering mechanical vibratory power theerto and providing a self-tuned circuit, with the windings, the primary and secondary windings providing a positive feedback between the collector and base electrodes causing the circuit to be maintained in an oscillatory condition and a circuit path between the base and emitter electrodes of a low impedance value during substantially all of each oscillatory cycle thereby causing maximum power to be applied across the crystal.

5. In a circuit as defined in claim 4 wherein said low impedance path comprises the base to emitter electrode circuit.

6. In a circuit as defined in claim 5 wherein said low impedance path comprises the base to emitter electrode circuit for one half of an oscillatory cycle and a diode coupled across the base to emitter electrode circuit for providing a low impedance path over the other one half of the oscillatory cycle.

7. An ultrasonic cleaning apparatus, the combination comprising a metallic tank, a piezoelectric crystal having a metallic coating on one side mechanically and electrically coupling the crystal to said tank for delivering mechanical vibratory power thereto, another side of said crystal having at least two separate metallic contacts thereon for energizing the crystal; a circuit for energizing said crystal comprising a transistor having base, emitter and collector electrodes, a transformer having a primary winding coupled in series with the emitter and collector electrode circuit of the transistor, and a secondary winding coupled in series with the base-electrode, means for coupling one metallic contact of said crystal between one end of said secondary winding and the other contact to the base electrode, and means for coupling the metallic tank and the other side of the emitter and collector electrode circuit to a point of zero potential, the primary and secondary windings being poled such that a positive signal is fed from the emitter and collector electrode circuit to the base electrode, thereby maintaining the circuit in an oscillatory condition, the base to emitter electrode circircuit having a low impedance during substantially all of an operating cycle thereby causing maximum power to be applied across said crystal.

8. In an ultrasonic cleaning apparatus the combination comprising a metallic tank, a piezoelectric crystal having a metallic coating on one side thereof mechanically and electrically coupling the crystal to said tank, another side of said crystal having at least two separate metallic contacts thereon for energizing the crystal and an electrical circuit having a first output circuit which is substantially zero potential at all times and a second pair of output circuits between which an alternating current signal appears for energizing said crystal, means for coupling said tank and metallic coating to said first output and thereby provide a point of zero potential to said metallic tank and to one side of said crystal, and means for coupling said two contacts, individually, to said pair of output circuits.

References Cited

UNITED STATES PATENTS

| | | | |
|---|---|---|---|
| 3,421,109 | 1/1969 | Wiggins et al. | 331—116 |
| 3,318,578 | 5/1967 | Branson | 310—8.9 X |
| 3,302,131 | 1/1967 | Pyatt | 310—8.3 X |
| 3,278,770 | 10/1966 | Shoh | 310—8.1 X |
| 3,277,465 | 10/1966 | Potter | 331—116 X |
| 2,755,384 | 7/1956 | Pierson et al. | 331—116 |

MILTON O. HIRSHFIELD, Primary Examiner

M. O. BUDD, Assistant Examiner

U.S. Cl. X.R.

331—116, 163

PO-1050
(5/69)

UNITED STATES PATENT OFFICE

CERTIFICATE OF CORRECTION

Patent No. 3,524,082 Dated August 11, 1970

Inventor(s) H.C. METTLER

It is certified that error appears in the above-identified patent and that said Letters Patent are hereby corrected as shown below:

Col. 3, line 51, "shows a pictorial view of the crystal assembly" should read --is a schematic and pictorial drawing depicting--;

Col. 4, line 23, "transducer" should read --transistor--;

Col. 7, line 9, delete "circuit".

SIGNED AND
SEALED
NOV 10 1970

(SEAL)
Attest:

Edward M. Fletcher, Jr.
Attesting Officer

WILLIAM E. SCHUYLER, JR.
Commissioner of Patents